United States Patent [19]

Janssen et al.

[11] Patent Number: 4,583,773
[45] Date of Patent: Apr. 22, 1986

[54] RELEASABLE TUBULAR CLAMPS FOR THE CONNECTION OF CYLINDRICAL OR PROFILED TUBES

[75] Inventors: Manfred Janssen, Moerserstr. 398, D-4150 Krefeld; Volker Schmidt, Muelheim; Theodor Bachmann, Langenfeld, all of Fed. Rep. of Germany

[73] Assignee: Manfred Janssen, Krefeld, Fed. Rep. of Germany

[21] Appl. No.: 584,553

[22] PCT Filed: June 29, 1983

[86] PCT No: PCT/DE83/00121
§371 Date: Feb. 29, 1984
§102e Date: Feb. 29, 1984

[87] Pub. No.: WO84/00202
PCT PUB. Date: Jan. 19, 1984

[51] Int. Cl.$^4$ .................. F16L 13/14; B65D 63/02
[52] U.S. Cl. .................. 285/382; 285/417; 24/20 CW; 24/20 TT
[58] Field of Search .............. 24/20 CW, 20 R, 20 W, 24/20 EE, 23 W, 23 R, 19, 489; 285/256, 382.2, 382.1, 382, 369, 417; 29/505

[56] References Cited

U.S. PATENT DOCUMENTS

| 972,489 | 10/1910 | Adams | 24/20 LS |
|---|---|---|---|
| 1,796,015 | 3/1931 | Francis et al. | 29/505 |
| 1,804,725 | 5/1931 | Walker | 24/20 TT |
| 2,073,338 | 3/1937 | Durkee | 285/382.2 |
| 3,087,221 | 4/1963 | Armstrong | 24/20 CW |
| 3,106,757 | 10/1963 | Thurston et al. | 24/20 CW |
| 3,295,176 | 1/1967 | Bright | 24/20 CW |
| 3,343,253 | 9/1967 | Omori | 29/505 |
| 3,402,436 | 9/1968 | Oetiker | 24/20 CW |
| 3,869,944 | 3/1975 | Oetiker | 24/20 CW |
| 3,905,623 | 9/1975 | Cassel | 285/417 |
| 4,315,348 | 2/1982 | Oetiker | 24/20 CW |

FOREIGN PATENT DOCUMENTS

| 783296 | 4/1968 | Canada | 24/20 CW |
|---|---|---|---|
| 2264954 | 7/1975 | Fed. Rep. of Germany | 285/382 |
| 1533332 | 7/1968 | France | 24/20 CW |
| 323127 | 12/1929 | United Kingdom | 24/20 CW |
| 1046710 | 10/1966 | United Kingdom | 24/20 CW |
| 1067968 | 5/1967 | United Kingdom | 285/382.2 |

Primary Examiner—Victor N. Bakran
Attorney, Agent, or Firm—Ralf H. Siegemund

[57] ABSTRACT

The invention refers to a releasable tubular clamp for connecting cylindrical or profile tubes. In order to provide a releasable tubular clamp for interconnecting cylindrical or profile tubes wherein the press force is increased and after assembly a greater degree of compactness and stiffness is present, a longitudinally running longitudinal rib (1) open towards the interior is provided which prior to clamping exhibits a U-shaped (ear-shaped) cross section and whose legs after clamping abut in parts whereby the clamping jacket in an adjoining area exhibits a cross section deviating from a circular contour.

6 Claims, 8 Drawing Figures

RELEASABLE TUBULAR CLAMPS FOR THE CONNECTION OF CYLINDRICAL OR PROFILED TUBES

BACKGROUND OF THE INVENTION

The invention relates to a releasable tubular clamp for clampingly interconnecting cylindrical or profiled members, prefereably tubes.

It is known to interconnect cylindrical members through threaded clamping rings which come in many varieties. For example, German printed patent application No. 28 00 062 illustrates two tubular half-shells which are placed above the ends of tubes to be interconnected and they are fastened through two threaded clamping shells. The German printed patent application No. 28 43 466 suggests two tubular half-shells for temporary use in discharge pipes of motor vehicles which half-shells hold together the ends of the tubes under utilization of one or two spring clamps.

Tubular clamping elements are known further which deform the tubes to be interconnected in a plastic fashion pursuant to being threaded together. The disadvantage of these clamps is to be seen in an insufficient mechanical strength and capability of sealing when the clamping elements are too weak, or disadvantages can be seen in a large, heavy and expensive dimensioning of the screws which can easily produce a plastic deformation.

Too strong a plastic deformation is undesirable because the ends to be interconnected become unsuitable for reuse with a new connecting clamp. Even the tubular clamping structure is not suitable for reuse because the plastic deformation favors leakage along the periphery. The screws which cause the plastic deformation of the clamp and of the tubular ends have to be dimensioned to be quite large, because, for example, the forces to be exerted upon tubes in a dimensional range from 40×1.5 mm by means of a clamping device of similar thickness, will exceed 1 megapond per centimeter clamping length.

The exhaust pipes of motor vehicles are connected in such a manner that one tube has a slot and is widened and shifted upon the other one. This plug connection is then secured through a threaded clamp. The expensive manufacture here is a disadvantage. Moreover, it is possible that upon widening the tubes they crack; also after some period of use the screws can be loosened only with difficulties.

Threaded clamps which can receive the unworked ends of discharge pipe are likewise to be loosened only with difficulties after some time of use. Moreover, they are quite heavy and oppose the principle of light weight in the construction of vehicles. A clamp has been suggested for discharge pipes which is comprised of particularly contoured tubing. The tubing has an ear shaped bulge on one or several locations in cross section which are forced in order to obtain the mechanical strength.

DESCRIPTION OF THE INVENTION

It is an object of the present invention to provide a releasable clamp for interconnecting cylindrical or profile tubes wherein the pressure force is enhanced and after assembly there is a larger degree of compactness and stiffness.

In furtherance of the object of the invention, a releasable tubular clamp is suggested as described in the patent claim. The advantage of the clamp suggested in accordance with the invention is to be seen in that the ends of the cylindrical or profiled elements to be interconnected do not require further working. Pressing is used by means of a suitable press tool whereby the clamp and the ends of the tube are deformed just to the limit of plastic deformation (possibly a little beyond). Any further plastic deformation is prevented by the fact that during pressing material flows from the clamping loop.

An advantageous employment of the clamp is also to be seen in the separation of the working steps, pressing and holding (clamping). The pressing is carried out through a separate tool, the holding through the clamp itself. For releasing the clamping connection, a further working step is required which can be carried out, for example, through a sheet metal cutter. Due to the simple clamping, it is possible to provide a significant simplification of the assembly procedure. In order to still better seal the cylindrical or profiled bodies to be interconnected, such as tubes, the clamp may carry an areal sealing material on the inside. The sealing material may extend around the entire periphery or only portions thereof, for example, the ear-shaped bulges to be press-worked. Alternatively, it is possible to provide a string-like seal within the rib-shaped bulging. The inventive clamp can be utilized without any problems for interconnecting bent tubes.

DESCRIPTION OF THE DRAWINGS

The appended drawings illustrate a feasible embodiment of a releasable tubular clamp in accordance with the preferred embodiment. The illustration is schematic in nature. They illustrate in:

As illustrated in FIGS. 1, 2, and 3 a cylindrical clamping jacket or sleeve 2 with worked-out bulge 1 is shown in pressworking position while receiving the tube ends 3 and 4 to be interconnected. In particular FIG. 1 illustrates the jacket 2, when providing a loose fit for receiving the tubes 3 and 4, prior to clamping action. In FIG. 2, there is shown the clamping jacket 2 press worked upon the tube ends 3 and 4.

As shown particularly in FIG. 3, the clamping jacket or sleeve 2 will receive flattened portions 5 and 6 adjacent to the bulge or ridge 1 and which are imparted as flattening upon the tube ends to be interconnected. FIG. 3 illustrates this aspect involving the deviation from the circular contour which is very important for the strength of the connection against twist; the illustration here is on an enlarged scale.

FIG. 4 illustrates the tube clamping connection after press working and in a perspective view. As can be seen specifically from the figure, the cylindrical clamping jacket or sleeve 2 is in surface-to-surface contact with the tubes 3 and 4, there being only some radially inwardly extending deformation (FIG. 3) on account of flattening near the bulge 1. In order to obtain the requisite sealing, sealing strings 7 or areal packings 8 are inserted or introduced into the bulge 1 (see FIGS. 5 and 6). It can readily be seen that the bulge or ridge 1 in the initial state is open towards the tubes 3 and 4. The sealing string 7 or the areal sealing layer 8 is comprised preferably of a temperature resisting material such as stone-wool in a loose configuration. Sealing can also be obtained through a paste.

As shown in FIGS. 7 and 8, the inventive tubular clamping connection is also suitable for connecting tubes which are arranged at an angle to each other. The clamping jacket here will receive the requisite bending configuration.

Figure 1:
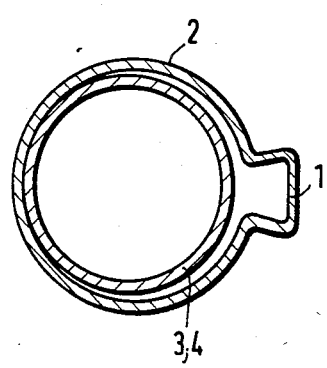
FIG. 1 a cross section of the clamping jacket with preformed bulge and inserted tube ends prior to press working.
Figure 2:
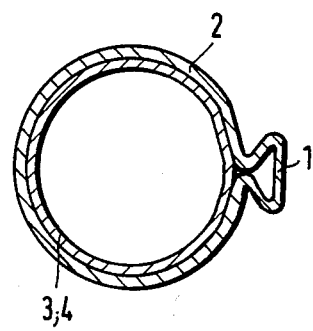
FIG. 2 a cross section in accordance with FIG. 1 after press working.
Figure 4:
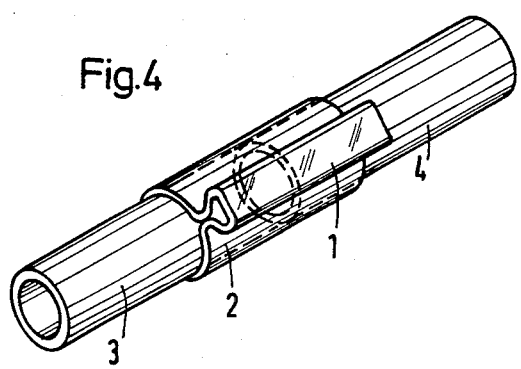
FIG. 4 a perspective view of the clamping connection.
Figure 3:
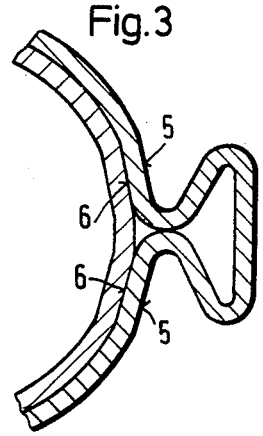
FIG. 3 an enlarged illustration of the press worked tube connection in the area of the ear-shaped bulges.
Figure 5:
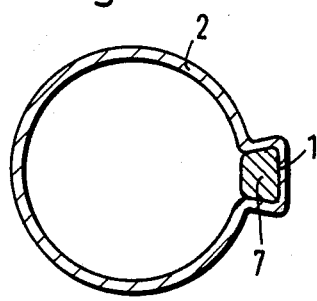
FIG. 5 a cross section through the clamping jacket with inserted sealing string in the bulge.
Figure 6:
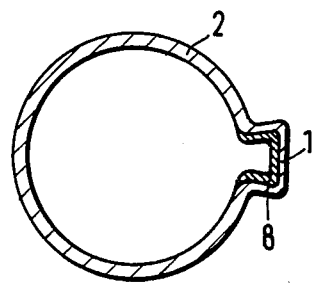
FIG. 6 a cross section just a FIG. 5 but with aerial sealing in the bulge.
Figure 7:
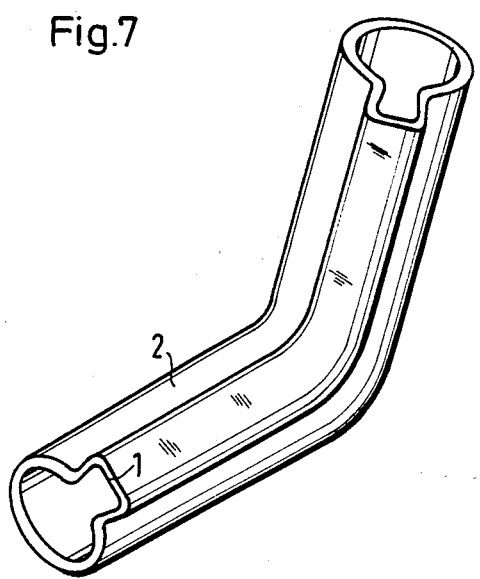
FIG. 7 an angled clamping jacket in perspective view.
Figure 8:
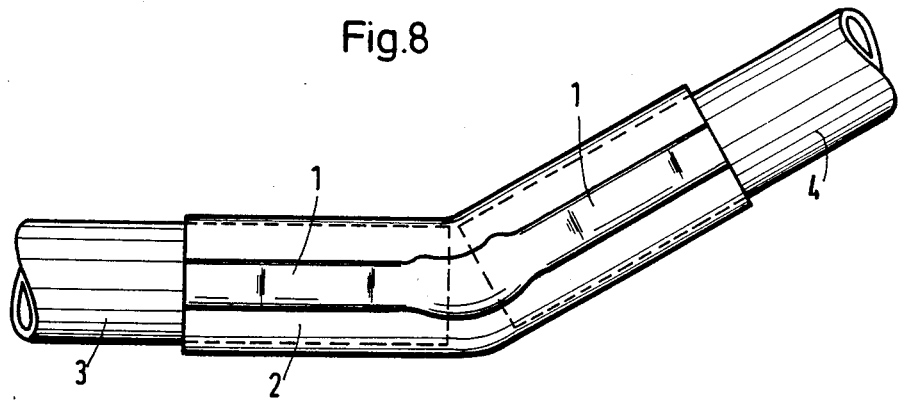
FIG. 8 a press worked tubular clamping connection with bent off clamping jacket in elevational view.

We claim:

1. A connection for releasably, sealingly, interconnecting cylindrical or profiled axially abutting metal tubes and including a radially effective clamp characterized by a tubular element in cylindrical contact with ends of the tubes and having a longitudinally running longitudinal rib open towards the interior which before clamping has a U-shaped cross section and whose legs after clamping abut in parts, the clamping jacket in a transition range from the tubular element to the legs deviating from a circular and cylindrical contour and containing material that has flowed as a result of plastic deformation from the legs.

2. Releasable tubular clamp in accordance with claim 1 characterised in that the range deviating from a circular contour is concavely, configured.

3. Releasable tubular clamp in accordance with claim 1, characterized in that the clamping jacket (2) is provided in its rib-shaped bulge with a sealing string (7).

4. Releasable tubular clamp in accordance with claim 1 characterised in that the clamping jacket (2) is provided in its rib-shaped bulge with an areal seal (8).

5. Releasable tubular clamp in accordance with claim 1 characterised in that the range deviating from a circular contour is convexly configured.

6. Releasable tubular clamp in accordance with claim 1 characterised in that the range deviating from a circular contour is planar configured.

* * * * *